March 17, 1959     W. T. JOHNSTON     2,877,751
THERMOSTATICALLY CONTROLLED COOLING SYSTEMS FOR
INTERNAL COMBUSTION ENGINES
Filed Feb. 6, 1957     2 Sheets-Sheet 1
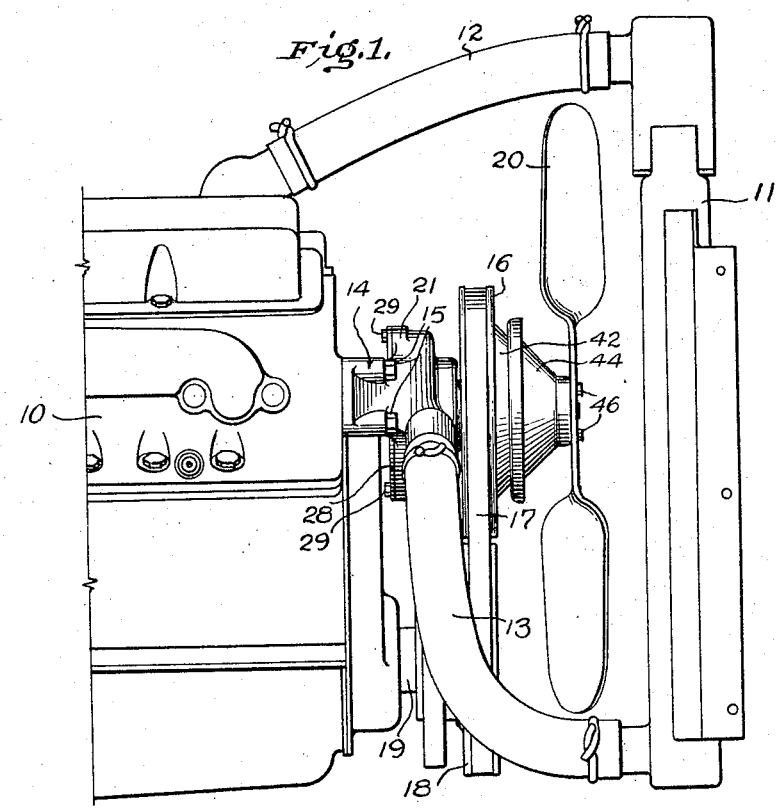
INVENTOR.
Willis T. Johnston
BY Reginald W. Hoagland
ATTORNEY March 17, 1959  W. T. JOHNSTON  2,877,751
THERMOSTATICALLY CONTROLLED COOLING SYSTEMS FOR
INTERNAL COMBUSTION ENGINES
Filed Feb. 6, 1957  2 Sheets-Sheet 2
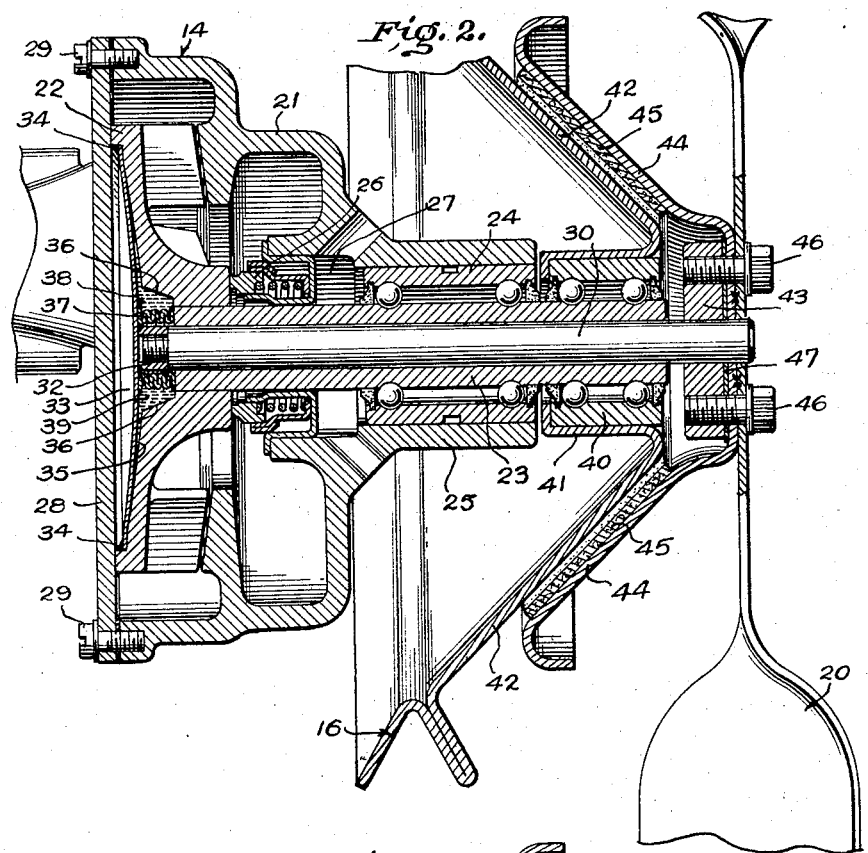
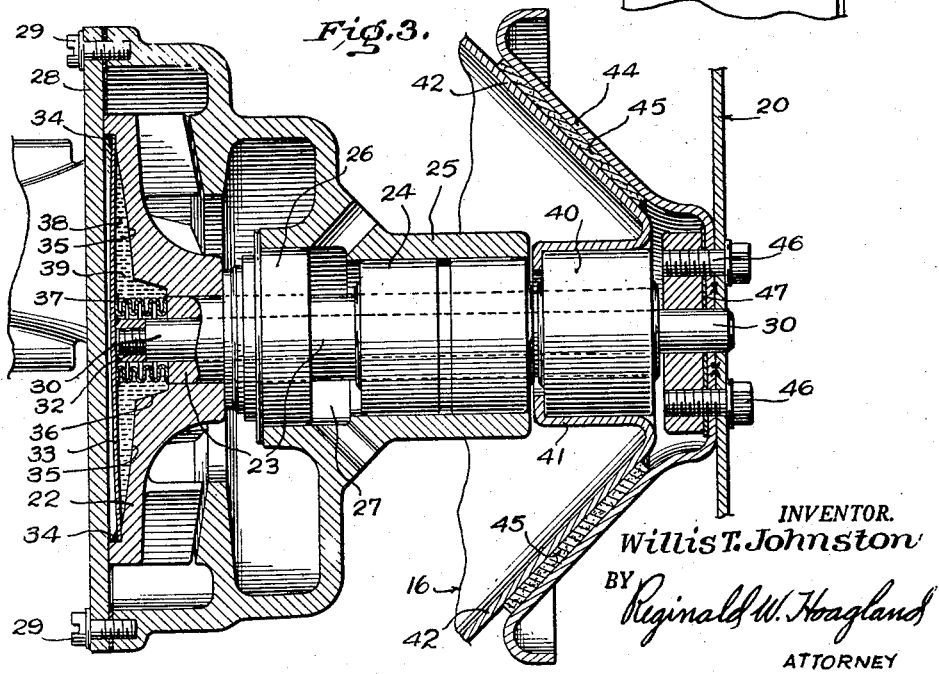
INVENTOR.
Willis T. Johnston
BY
Reginald W. Hoagland
ATTORNEY

United States Patent Office 2,877,751
Patented Mar. 17, 1959

2,877,751

THERMOSTATICALLY CONTROLLED COOLING SYSTEMS FOR INTERNAL COMBUSTION ENGINES

Willis T. Johnston, Dawson, Iowa, assignor of one-half to Evelyn Dew, Flint, Mich.

Application February 6, 1957, Serial No. 638,574

3 Claims. (Cl. 123—41.12)

The present invention relates to thermostatically controlled mechanisms and more particularly to mechanisms that control the operation of cooling mediums of internal combustion engines according to temperature of the coolants for the engines.

The cooling system of an internal combustion engine now commonly used on automotive vehicles is designed with two purposes in mind; first, to carry off a certain amount of the heat created in the engine so it will not operate at too high a temperature, and second, to maintain the engine heat at the temperature which will produce the most efficient and economical operation of the engine. This is usually accomplished by water jacketing the combustion chambers of the engine and circulating a coolant with a pump through the jacket and a cooling radiator, there being an air-circulating fan employed for drawing cooling air through the radiator and forcing it over the engine.

In starting a cold engine, it is desirable that the engine be brought to its most efficient operating temperature as quickly as possible and be maintained at such temperature while running irrespective of atmospheric temperatures or load conditions. With this objective in mind, it can readily be seen that should either or both of the cooling mediums, namely, the fan and the pump, be operated only during periods of abnormal temperature of the engine, there will be efficient and economical operation of the engine, quicker warm-up of the engine, and less battery and engine power consumed in starting and operating the engine.

It is accordingly a primary object of the invention to provide a mechanism that automatically controls the operation of a cooling medium of an engine in accordance with the temperature of the engine.

Another object of the invention is to provide a thermostatically controlled clutch for disconnecting the drive of a cooling medium of an internal combustion engine when the temperature of the coolant for the engine is below the recommended operating temperature of the engine and for connecting the drive to the cooling medium when the temperature of the coolant reaches or exceeds that recommended.

Another object of the invention is to provide a thermostatically controlled clutch for connecting and disconnecting the drive to an air-circulating fan of an internal combustion engine according to the temperature of a coolant for the engine.

A further object of the invention is to provide a thermostatically controlled clutch for connecting and disconnecting the drive to an air-circulating fan and to a coolant-circulating impeller of an internal combustion engine according to the temperature of the coolant.

A further object of the invention is to provide, in a mechanism as set forth above, a novel and improved thermostat structure wherein a clutch will engage quickly with a snap action and thus avoid harmful prolonged slippage of the clutch.

A still further object of the invention is to provide, in a mechanism as outlined above, a novel and improved thermostat structure consisting of a sealed reservoir containing a substance expansible upon an increase of temperature and having a thin resilient and inwardly dished end wall which is attached to a clutch and which is deformed outwardly within its elastic limit and against its spring tension by expansion of the substance so as to impart movement to engage the clutch.

It is also an object of the invention to provide a thermostatically controlled clutch mechanism of the above-indicated character which is extremely simple and substantial in construction, inexpensive to manufacture, and yet effective and efficient in use.

Other and further objects of the invention will become apparent from a reading of the following specification taken in conjunction with the accompanying drawings, in which:

Figure 1 is a fragmentary side elevation of an internal combustion engine illustrating the application of my thermostatically controlled mechanism thereto;

Figure 2 is an enlarged section through the improved mechanism showing the position of parts when the drive for the fan and impeller of the pump is disconnected;

Figure 3 is a similar sectional view, but showing the position of parts when a drive is effected; and Figure 4 is also a similar sectional view with parts in the position shown in Figure 2 but illustrating a modified form of the invention whereby operation of the impeller of the pump is not controlled by the thermostat.

Referring now more specifically to the accompanying drawings wherein like numerals designate similar parts throughout the various views, attention is directed first to Figure 1 wherein it will be seen that there is indicated at 10 the forward portion of an internal combustion engine, the combustion chambers of which are jacketed for containing a coolant which is circulated through a radiator 11 by upper and lower conduits 12 and 13, respectively. A pump 14 bolted, as at 15, to the cylinder block of the engine and communicating with the interior of its jacket and with the lower conduit 12, forces coolant to circulate through the jacket and radiator. A pulley 16 on the pump 14 and driven by a belt from another pulley 18 on the crankshaft 19 of the engine operates said pump and also operates a fan 20 which is mounted coaxially with the pump and pulley and which draws cooling air through the radiator and circulates it over the engine.

The pump 14 is of the centrifugal vane impeller type and has provided on its housing 21 the customary watertight connections that communicate its interior with the conduit 13 and engine jacket. An impeller 22, as shown in detail in Figures 2 and 3, is rotatably mounted within the housing 21 by being press fitted on an end of a shaft 23 of a shaft and bearing assembly that has the bearing 24 thereof press fitted into a hub 25 of the housing 21. A seal 26 surrounding the shaft 23 and press fitted into an annular recess 27 in the pump housing maintains a constant pressure against a circular face of the active side of the impeller 22 to prevent leakage of coolant. An open rear side of the housing 21 is shown as being closed by a removable back plate 28 bolted, as at 29, to the housing but it is to be understood that the pump may be of the type where a back plate is not employed and the housing 21 is bolted directly to the cylinder block of the engine.

The pump 14, pulley 16, and the fan 20 just described are somewhat of the same general construction and appearance as those now commonly employed, and it is to altered constructions and arrangements of elements of this character that the present invention as set forth in the following description is applied.

Reference is again made to the form of invention illustrated in Figures 2 and 3 wherein the rotatable shaft 23 is tubular and has a second shaft 30 slidable endwise therein and protruding from opposite ends thereof. The rear protruding end of this second shaft is secured, as at 32, to the center of a disclike resilient plate 33 which has its peripheral edge portion secured by soldering or the like 34 to the rear and inactive side of the impeller 22. There is a cavity 35 of slight depth and large diameter in the rear side of the impeller into which the resilient disc 33 is dished (Figure 2), and it is at the brim of the cavity that the resilient disc is fixed. Centrally, the cavity is cupped to a greater depth, as at 36, and it is at the depth of the portion 36 that the tubular shaft 23 terminates and there is affixed one end of a bellows-type seal 37 that surrounds the connection 32 of the shaft 30 to the resilient disc 33. The other end of the seal 37 is affixed to the resilient disc 33 so as to close off the shafts 23 and 30 and thereby provide a sealed reservoir 38 between adjacent surfaces of the impeller 22 and flexible disc 33.

A liquid or gaseous substance 39 which is expansible upon an increase of its temperature is sealed within the reservoir 38 and deforms the dished portion of the resilient disc outwardly (Figure 3) within its elastic limit and against its spring tension upon expansion of said substance so as to slide the inner shaft 30 rearwardly in the tubular shaft 23 for a purpose to be set forth as the description proceeds. The inwardly dished resilient disclike plate is so stressed that resistance to its deformation is greater at the initiation of an expansion force by the substance 39 than its resistance to further outward deformation and also greater than an expansion force necessary to maintain it deformed and against its return to its initial position.

Also constructed a part of the previously mentioned shaft-and-bearing assembly and on the tubular shaft 23 thereof forwardly of the bearing 24 is another and like bearing onto the outer race 40 of which is press fitted a hub 41 of the pulley 16 for free rotation of the pulley relative to the shaft. The pulley and its hub are of the usual one-piece sheet metal stamping construction and has a conical wall between its grooved rim and its hub that tapers rearwardly as it expands outwardly and forms a clutch part 42.

Fixed to the forward protruding end of the inner shiftable shaft 30 by means of a press fit or the like is a hub 43 of the air-circulating fan 20, and welded or otherwise fixed to the fan is a conical disc complementary to the conical wall of the pulley which forms another clutch part 44. Friction lining material 45, shown as being cemented to the inner conical surface of the clutch part 44 is brought into engagement with the outer conical surface of the other clutch part 42 on the pulley to establish a driving connection between the pulley and the fan upon shifting of the inner shaft 30 rearwardly. The fan 20 and clutch part 44 welded thereto are separate from the fan hub 43, and the fan is clamped to the forward side of the hub by bolts 46 in a manner now commonly practiced. This permits the insertion of a shim or shims 47 of different thicknesses between these elements for adjustment of the time of engagement of the clutch relative to the distance of rearward sliding movement of the inner shaft 30.

Following is a description of the operation of the form of invention shown in Figures 2 and 3. When the temperature is the coolant in the pump housing is below that of efficient and economical operation of the engine, the substance 39 in the reservoir 38 contracts, and the resiliency of the flexible rear wall 33 causes said wall to assume its dished-in position shown in Figure 2. The shaft 30, by being connected at its opposite ends to both the flexible rear wall 33 and clutch part 44, supports the lining 45 on said clutch part out of engagement with the clutch part 42 on the pulley 16. Because of this disengagement of clutch parts, the pulley 16, which is rotated constantly during operation of the engine, rotates free of a driving connection to the impeller 22 of the pump 14 and the fan 20. By stopping operation of both of these cooling mediums, the engine will heat up more rapidly to the recommended temperature for proper operation thereof.

During the rise of temperature of the coolant in the pump, due to engine heat, the substance 39 in the reservoir 38, in attempting to expand, builds up pressure, and upon reaching a predetermined temperature, overcomes the spring tension of the resilient dished-in wall 33 and deforms said end wall outwardly (Figure 3). Because of lesser spring tension of the resilient end wall after initial deformation from its dished-in shape, a snap action is produced which engages the clutch parts quickly to avoid a harmful prolonged slippage of the clutch. Upon engagement of the clutch, both the fan 20 and impeller 22 of the pump operate in their customary manner.

At times when the engine is running with the pump and fan operating and the engine temperature falls below that desirable, the energy stored in the resilient end wall 33 returns it to its initial dished-in position as outward pressure thereon is decreased by contraction of the substance 39. While the return energy exerted by the resiliency of the end wall 33 is the greatest just prior to its assuming its relaxed position, this is, however, not as important in preventing slippage of clutch parts when disengaging the clutch, because there is a tendency of the parts to rotate together due to momentum.

While the drive connection from the inner shiftable shaft 30 to the impeller 22 is illustrated as being through the resilient end wall 33 of the reservoir, it is to be understood that the shaft 30 may be splined to the tubular shaft so as to connect the impeller direct to the shaft 30.

Refer now to the form of invention illustrated in Figure 4 wherein the coolant is circulated through the engine and the radiator at all times during operation of the engine and only the air-circulating fan is controlled as to its time of operation by the temperature of the engine. In this case, a pulley 16$^a$ as well as an impeller 22$^a$ of a pump 14$^a$ are both fixed to a tubular shaft 23$^a$ so as to provide a direct drive of the impeller from the pulley, and a fan 20$^a$ with a clutch part 44$^a$ thereon is rotatably mounted by a bearing 48 on the forward end of an inner shiftable shaft 30$^a$. The pulley is fixed to the forward end of the tubular shaft 23$^a$ by a bushing 40$^a$ press fitted to both the shaft and hub 41$^a$ of the pulley.

For shifting the inner shaft 30$^a$ axially to engage a lining 45$^a$ on the clutch part 44$^a$ with another clutch part 42$^a$ on the pulley 16$^a$, there is attached, as at 32$^a$, to the rear end of the shaft 30$^a$ a resilient end wall 33$^a$ of a reservoir element 38$^a$ containing a substance 39$^a$ expansible upon an increase of the temperature thereof. The reservoir element 38$^e$ is stationary and is interposed between the rotatable impeller 22$^a$ and a rear closure plate 28$^a$ of a pump housing 21$^a$ by clamping a flange 49 on said reservoir element between the parts 21$^a$ and 28$^a$ with bolts 29$^a$. A forward rigid wall 50 of the reservoir element 38$^a$ has an opening 51 therein through which the shaft 30$^a$ slides, and there is an O ring 52 at said opening and engaging said shaft to stop seepage of coolant into a bellows-type seal 37$^a$ joined at opposite ends to the resilient rear wall 33$^a$ and rigid front wall 50 of the reservoir element.

The resilient end wall 33$^a$ is of the same construction and has the same characteristics as to its operation as that of the end wall 33 previously described and relative to the other embodiment of the invention, the object being to eliminate to the greatest degree slippage of clutch parts by quickly engaging the clutch and thereby actuate the fan 20$^a$ when slowly rising temperature of the engine reaches the point recommended for efficient and economical operation of the engine.

In view of the foregoing description taken in conjunction with the accompanying drawings, it is believed that a clear understanding of the construction, operation, and advantages of both forms of the invention will be quite apparent to those skilled in this art. A more detailed description is accordingly deemed unnecessary.

It is to be understood, however, that even though there are herein shown and described preferred embodiments of the invention, the same is susceptible to certain changes fully comprehended by the spirit of the invention as herein described and the scope of the appended claims.

What is claimed is:

1. A mechanism for controlling the operation of a cooling fan and a coolant circulating pump of a liquid-cooled engine, said mechanism comprising a pump housing, a tubular shaft rotatably mounted in said housing, a pump impeller in said housing and fixed to said tubular shaft, a pulley exteriorly of said housing and journaled coaxially of said shaft for free rotation relative to said shaft, a clutch face on said pulley, a second shaft slidably mounted for endwise movement in said tubular shaft and protruding from opposite ends thereof, a fan secured to one protruding end of said shaft for rotation therewith, a second clutch face on said fan for engaging and disengaging said first-mentioned clutch face upon sliding movement of said second-mentioned shaft and fan in opposite directions, and a thermostatically actuated means on said impeller and effected by the temperature of the engine coolant liquid and fixed to the opposite protruding end of said second-mentioned shaft so as to slide said second-mentioned shaft and said fan in a direction to engage said clutch faces on the attainment of a predetermined temperature of the coolant liquid.

2. A mechanism as defined in claim 1 wherein the thermostatically actuated means consists of having a cavity in and centrally of a normally inactive side of the impeller, a thin resilient and inwardly dished plate forming a wall that closes said cavity, a substance in said closed cavity that is expansible upon an increase of its temperature, said inwardly dished wall being deformed outwardly within its elastic limit and against its spring tension by expansion of said substance, the resiliency of said inwardly dished wall being so stressed that resistance to its deformation is greater at the initiation of an outwardly flexing force thereto than a force necessary to maintain it deformed and against return to its initial inwardly dished position, the connection of said second-mentioned shaft to the thermostatically actuated means being on mid resilient plate so as to impart sliding movement to said second-mentioned shaft and fan upon outward deformation of said resilient plate.

3. A thermostat responsive to the temperature in a fluid circulatory cooling system of an internal combustion engine for actuating a clutch in a driving mechanism to a rotary cooling medium for the engine, said thermostat consisting of a closed reservoir, a substance in said reservoir that is expansible upon an increase of its temperature, a thin resilient and inwardly dished wall on said reservoir that is deformed outwardly within its elastic limit and against its spring tension by expansion of said substance, the resiliency of said inwardly dished wall being so stressed that resistance to its deformation is greater at the initiation of an outwardly flexing force thereto than its resistance to further outward deformation and also greater than a force necessary to maintain it deformed and against return to its initial position, and attaching means on said resilient wall for connection to the clutch.

References Cited in the file of this patent

UNITED STATES PATENTS

| | | |
|---|---|---|
| 1,820,035 | Stokes | Aug. 25, 1931 |
| 2,438,161 | Greenlee | Mar. 23, 1948 |
| 2,633,697 | Johnson | Apr. 7, 1953 |
| 2,658,400 | Dodge | Nov. 10, 1953 |
| 2,786,456 | Heiss | Mar. 26, 1957 |